Dec. 15, 1964  R. R. ANNIS ETAL  3,161,796
STATOR FOR FRACTIONAL HORSEPOWER MOTORS
Filed March 8, 1961
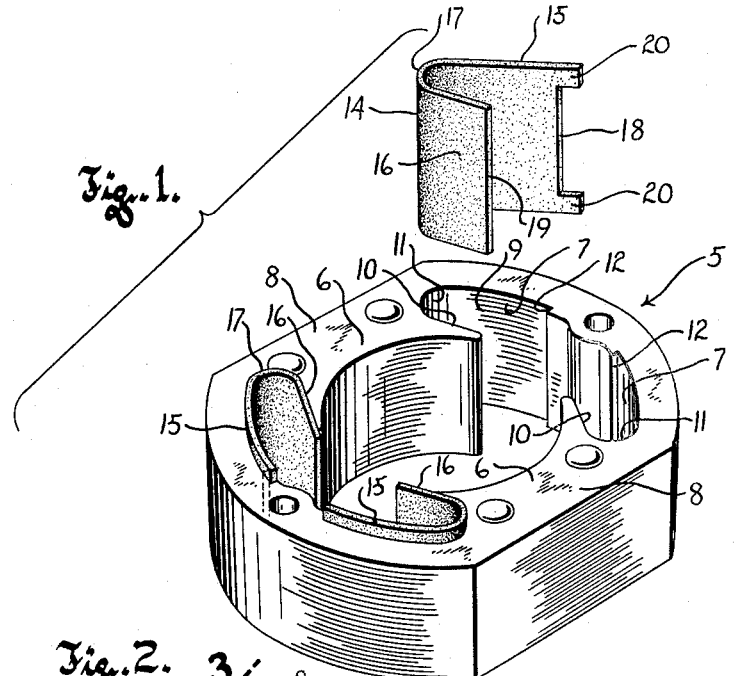
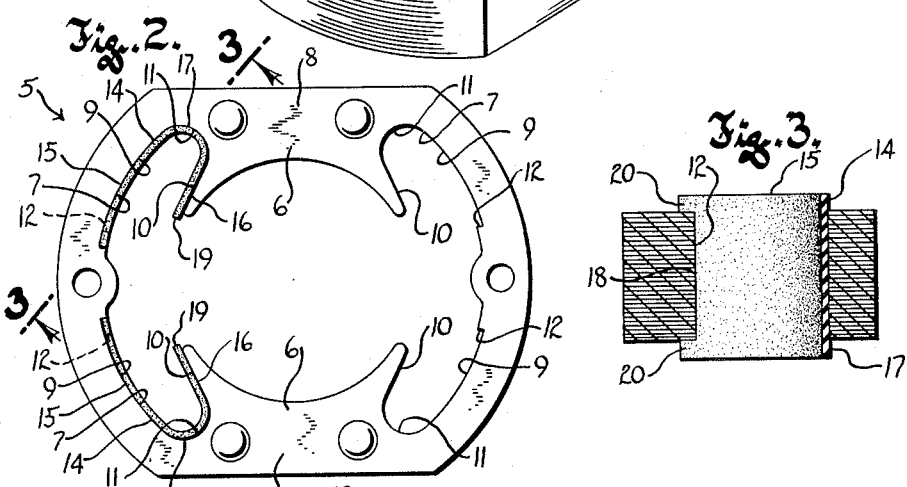
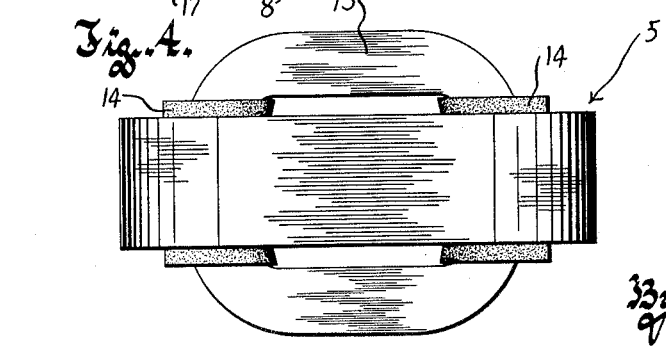
Richard R. Annis
John R. Dorner

3,161,796
STATOR FOR FRACTIONAL HORSEPOWER MOTORS

Richard R. Annis and John R. Dorner, Milwaukee, Wis., assignors to John Oster Manufacturing Co., Milwaukee, Wis., a corporation of Wisconsin
Filed Mar. 8, 1961, Ser. No. 94,355
1 Claim. (Cl. 310—215)

This invention relates broadly to electric motors and refers more particularly to the stators of fractional horsepower motors, and especially to stators which have deep slotted cores.

Stators which have deep slotted cores have their coils wound about the necks which connect the core poles with the rest of the core, as distinguished from prewinding and taping the coils and then applying them to the core. While winding the field coils directly on the stator core has the advantage of enabling the operation to be performed on automatic machines, it aggravates the problem of adequately insulating the coils from the core and keeping them from direct contact with the core. In the past, the slots simply have been lined with paper or fiber before the coils were wound, with the hope that these liners would not shift or tear before and during the winding operation. Often this hope was not fulfilled. Where attempts were made to secure the liners against displacement, other objections were introduced, such as additional parts and the possibility of having the liner pushed away from the bottom of the slot.

It is therefore the object and purpose of this invention to provide an improved stator core for fractional horsepower motors which includes an improved insulating liner for the slots in the core.

Another object of this invention is to provide an insulating liner for the coil slots of the stator cores of fractional horsepower motors which, by its very nature, not only holds itself in snug contact with all walls of the slot, but, in addition, secures itself against edgewise displacement from the slot once the liner is assembled with the core.

With the above and other objects in view which will appear as the description proceeds, this invention resides in the novel construction, combination and arrangement of parts substantially as hereinafter described and more particularly defined by the appended claim, it being understood that such changes in the precise embodiment of the hereindisclosed invention may be made as come within the scope of the claim.

The accompanying drawing illustrates one complete example of the physical embodiment of the invention constructed according to the best mode so far devised for the practical application of the principles thereof, and in which:

FIGURE 1 is a perspective view of the stator core of a two-pole fractional horsepower motor, showing two of the insulating slot liners of this invention in place, and a third such liner removed from the core to better illustrate the same;

FIGURE 2 is a plan view of the stator core shown in FIGURE 1, with two insulating liners in position;

FIGURE 3 is a detail sectional view through FIGURE 2 on the plane of the line 3—3; and FIGURE 4 is a side view of the completed stator with the coils in place.

Referring now particularly to the accompanying drawing, the numeral 5 designates the core of a fractional horsepower motor having two poles 6 defined by pairs of opposed relatively deep slots 7. These slots not only define the poles 6, but also narrow necks 8 by which the poles are connected to the rest of the core. As is customary, the core 5 consists of a stack of laminations secured together by rivets or any other suitable means.

Each slot 7 has a concavely curved outer side wall 9 and a relatively flat and much shorter inner side wall 10, connected by a curved bottom wall 11 which merges with both side walls. The curvature of the outer side walls 9 is concentric to the axis of the stator and at the ends of these outer side walls 9 there are abrupt shoulders 12 which face the bottoms of the slots. The field coils 13, one of which appears in FIGURE 4, are wound about the necks 6 and occupy the slots which define the neck.

As is well known in the art, it is of utmost importance that the coils be kept from contacting the core, not only during the winding thereof but also after they have been wound and the core is ready for assembly into a motor. Unless protection is afforded against contact between the wire of the coil with the core, the insulation of the wire may be rubbed off if it is enamel, or shifted to expose the bare wire if cotton or the like is used as its insulation.

Simply lining the walls of the slot with paper or fiber as has been the practice in the past, does not afford the required assurance against objectionable and damaging contact between the wire of the coils and the laminations of the core. To afford the required assurance against this happening, it is necessary that the walls of the slots be covered with an insulating liner that will not be torn as the coils are wound, and that will not shift but, instead, is held securely against displacement from a position snugly hugging all walls of the slot, with the edge portions of the liner projecting substantially equal distances beyond the opposite faces of the core.

The liner indicated by the numeral 14 accomplishes this purpose. It consists of a U-shaped strip of resilient fiber or other similar insulating material having substantially uniform thickness and a uniform width greater than the thickness of the core. As shown in FIGURE 1, one leg 15 of the liner is longer than the other leg 16, and the bight 17 connecting the legs is curved and merges with them.

Before the liner is assembled with the core, its legs 15 and 16 are divergingly spread apart a distance greater than the space between the side walls of the slots, so that during assembly of the liner with the core its legs must be flexed inwardly. The inherent resilience of the material of which the liner is made thus holds the liner in position.

The length of the strip which forms the liner is such that when the end 18 of its long leg bears against the adjacent shoulder 12, the end 19 of its short leg 16 extends slightly beyond the end of the inner side wall 10 of the slot.

To hold the liner against edgewise displacement from its proper position in which its edge portions project substantially equal distances beyond the opposite faces of the core, the end of its long leg 15 has spaced ears 20 projecting therefrom to extend beyond the shoulder 12 and embrace the adjacent portion of the core. The portions of the opposite faces of the core and the ears 20 thus constitute cooperating abutment means on the core and the liner which upon engagement serve to hold the liner in place.

From the foregoing description taken in connection with the accompanying drawings, it will be apparent to those skilled in the art that this invention provides an extremely simple way of effectively and positively insulating the field coils of a fractional horsepower electric motor from the laminated stator core of the motor, and that this objective is achieved through the provision of a slot liner of such design and formation that it holds itself in intimate contact with all walls of the slot and against shifting edgewise with respect to the core.

What is claimed as our invention is:

In a stator for a fractional horsepower electric motor:

(A) a core having paired back-to-back oppositely facing slots defining a pole for the motor and a narrow neck connecting the pole with the core,
   (1) said slots having inner and outer side walls connected by concavely curved bottom walls,
   (2) the portions of the bore between said curved bottom walls forming the narrow neck;
(B) an abrupt shoulder in the outer side wall of each slot near the end thereof and facing the bottom of the slot;
(C) an insulating liner covering the walls of each slot,
   (1) said liners comprising strips of resilient insulating material wider than the thickness of the core and long enough to extend to the ends of the side walls of the slot when the medial portion of the strip is tight against the bottom wall of the slot;
   (2) the portion of the insulating liners which covers the outer wall of each slot having its end abutting the shoulder therein and being confined between the shoulder and the bottom of the slot so that the resilience of the liners holds them in their respective slots in snug engagement with the walls thereof;
(D) a pair of spaced ears projecting from the end of each insulating liner which abuts a shoulder,
   (1) said spaced ears extending beyond the shoulders and embracing the adjacent portions of the core to hold the liners against edgewise displacement from a position substantially centered with respect to the core thickness so that the edge portions of the insulating liners project substantially equal distances beyond the adjacent faces of the core; and
(E) a coil wound about said neck so that the opposite portions of the coil occupy the slots, the projecting edge portions of the insulating liners holding the coil spaced from the opposite faces of the core, whereby said liners constitute the sole means for insulating the coil from the core.

References Cited in the file of this patent
UNITED STATES PATENTS

| | | |
|---|---|---|
| 1,823,979 | Jordan | Sept. 22, 1931 |
| 2,631,251 | Spielman | Mar. 10, 1953 |
| 2,999,176 | Lindstrom et al. | Sept. 5, 1961 |